Jan. 26, 1965
M. H. PELAVIN
3,166,929
CHROMATOGRAPHY ANALYSIS APPARATUS WITH
STANDARDIZATION PROVISION
Filed July 13, 1961
2 Sheets-Sheet 1
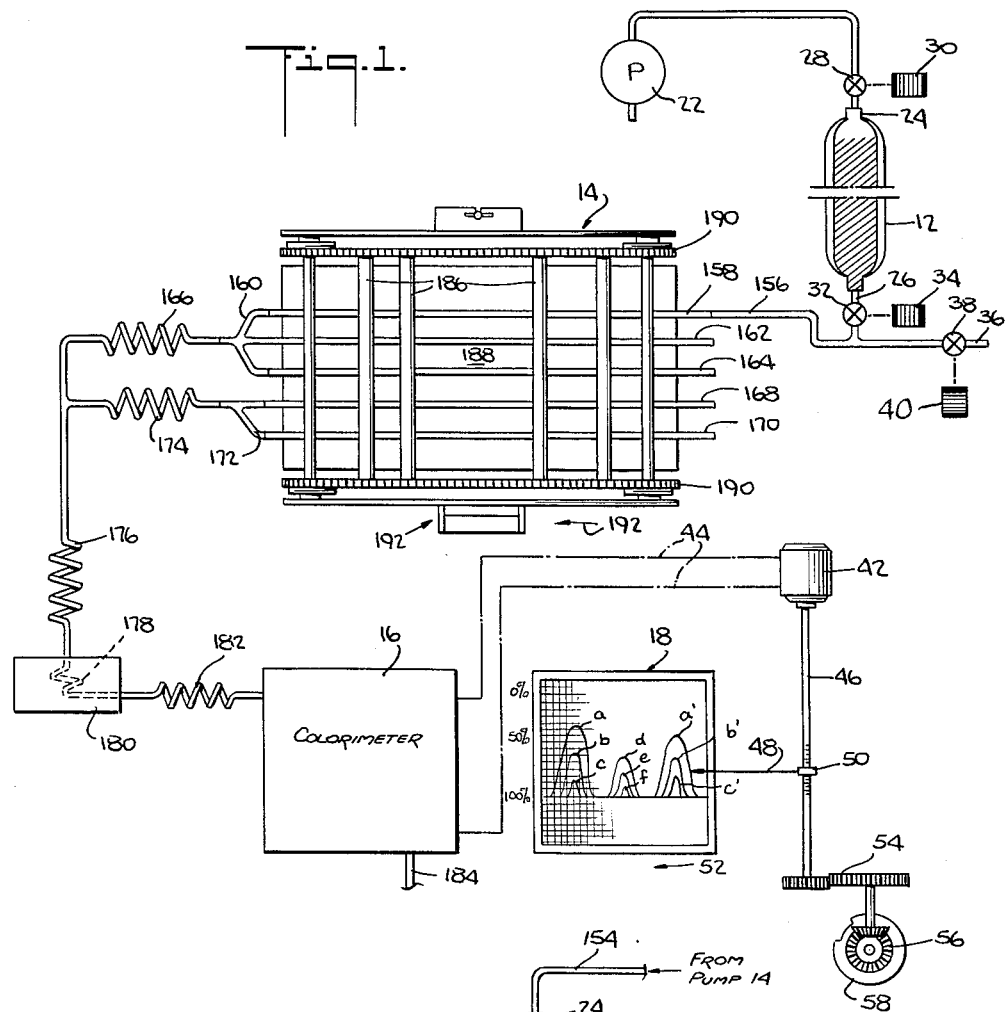
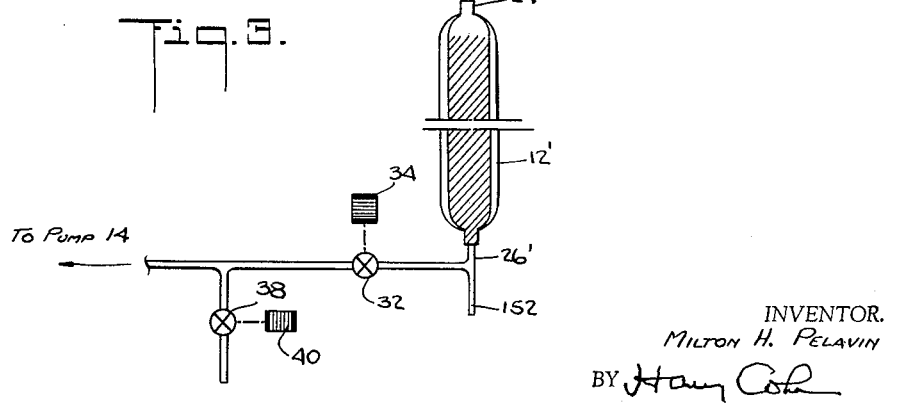
INVENTOR.
MILTON H. PELAVIN
BY Harry Cohen
ATTORNEY

INVENTOR.
MILTON H. PELAVIN
BY
ATTORNEY

United States Patent Office 3,166,929
Patented Jan. 26, 1965

3,166,929
CHROMATOGRAPHY ANALYSIS APPARATUS
WITH STANDARDIZATION PROVISION
Milton H. Pelavin, Greenburgh, N.Y., assignor to Technicon Chromatography Corporation, Chauncey, N.Y., a corporation of New York
Filed July 13, 1961, Ser. No. 123,721
7 Claims. (Cl. 73—53)

This invention relates to chromatography analysis apparatus.

One of the objects of the present invention is to provide a continuous chromatography quantitative analysis apparatus with means for periodically interrupting the eluate analyzing operation of the apparatus and for introducing a standard liquid having a known constituent of known concentration into the apparatus for a standardization operation of the apparatus to determine whether the apparatus is operating properly.

A further object is to provide means for the standardization operation of the analysis apparatus between eluate examining periods in a manner which avoids interference with the recording of the results of the eluate examinations.

Another object is to provide means under the control of the recorder of the apparatus for introducing the standard liquid only when the stylus of the recorder is at or near the base line of the recording on the chart paper.

The above and other objects, features and advantages of the invention will be more fully understood from the following description of the presently preferred embodiments of the invention considered in connection with the accompanying drawings which are to be considered as illustrative of the invention and not as limitations thereof.

In the drawings:

FIG. 1 is a more or less diagrammatic illustration of the apparatus according to the present invention;

FIG. 3 shows part of the apparatus and illustrates a modification.

Figure 2:
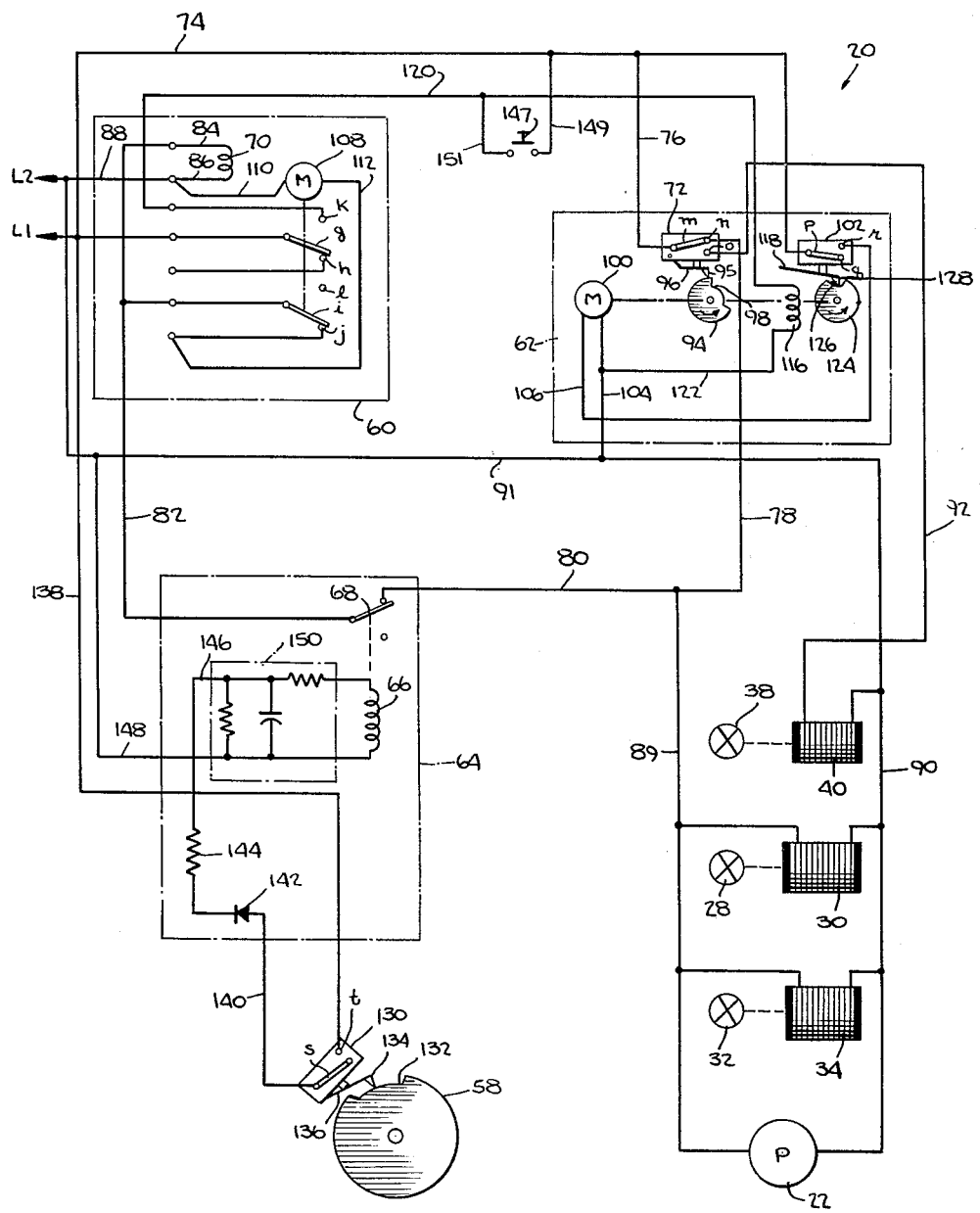
FIG. 2 illustrates a circuit for controlling the operation of the apparatus.

Referring now to the drawings in detail and particularly to FIGS. 1 and 2, the chromatography analysis apparatus comprises a chromatography column 12, a proportioning pump 14, a colorimeter 16 of the flow cuvette type, a multi-point recorder 18 operable under the control of the colorimeter and a control circuit 20 (FIG. 2) for controlling the operation of the apparatus. The apparatus is of the continuous flow type wherein a pump 22 transmits a stream of eluent to the inlet opening 24 at the top of the column 12 and the eluent flows downwardly through the column for eluting the various zones of the chromatogram and the resulting eluate is concurrently transmitted from the outlet opening 26 at the bottom of the column, by the aspirating action of pump 14, and is treated for colorimetric analysis, as will be explained more in detail hereinafter.

The eluent may be supplied to pump 22 from any convenient source but it is preferable that the eluent is supplied from a variable gradient device so that the concentration of the eluent varies in a continuous manner to improve the resolution of the various zones of the chromatogram. The inlet opening 24 of the column is controlled by a solenoid operated valve of any suitable type, here shown as a valve 28 which is opened by a solenoid 30. Outlet opening 26 of the column is controlled by a similar valve 32 which is operated by a solenoid 34. The solenoids are preferably of the spring biased type so that when they are de-energized they are biased into position to close their respective valves.

A standard liquid having a known constituent of known concentration is supplied from a suitable source (not shown) to conduit 36 and the flow of the standard liquid through said conduit and the apparatus is controlled by a normally closed valve 38 which is operated by a spring biased solenoid 40.

In accordance with the invention, the eluate examining operation of the apparatus is periodically interrupted, the flow of eluent to the column and the flow of eluate from the column being interrupted by closing of valves 28 and 32, and concurrently with the closing of these valves, valve 38 is opened to permit the transmission of the standard liquid to the apparatus in lieu of said eluate for standardization operation of the apparatus to provide a series of light transmittance curves representing the concentration of the known constituent of the standard liquid. If the apparatus is operating properly, the resulting curves from standardization operation should indicate the same light transmittance values versus concentrations previously established for the apparatus with respect to the standard liquid. If the resulting curves differ from those previously established, it indicates that the apparatus should be recalibrated or adjusted. For example, if the results of the standardization operation provide light transmittance curves which differ from those formed during an earlier standardization operation, then the technician or operator is informed that the apparatus is operating improperly and can determine if the apparatus should be recalibrated or adjusted.

The eluate curves are indicated on the chart paper of recorder 18 by the letters $a$, $b$ and $c$ and $a'$, $b'$ and $c'$, and the standard curves resulting from the colorimetric examination of the standard liquid are indicated by the letters $d$, $e$ and $f$. It is to be noted that the eluate curves are separated from each other by the standard curves and it will be understood that the eluate curves $a$, $b$ and $c$ represent the constituents or characteristics of the eluate from one zone of the chromatogram and the eluate curves $a'$, $b'$ and $c'$ represent the constituents or characteristics of the eluate of a succeeding zone which is eluated from the chromatography column. Three curves are shown for each eluate since the eluate is preferably examined by the colorimeter by light of two different wave lengths, each passing through a light path for the liquid which is of the same length as the other light path and by light of the same wave length as one of said wave lengths but which passes through a light path which is longer than the other light paths. This is in accordance with known practice so that records of the different characteristics of the eluate are formed on the recorder as a result of the flow of the eluate through the colorimeter 16. In the case of the standard liquid having one constituent only, the three curves $d$, $e$ and $f$ result from the colorimetric examination of said constituent in the same manner as the colorimetric examination of the eluate. The multi-point recorder 18 is a well known type of recorder and is not, per se, part of this invention, and therefore does not require further description.

The colorimeter is of a well known type and includes photo-electric devices, which are responsive to the light absorption characteristics of the liquid being examined and provide voltages whose differences are effective to control the operation of a null-type balancing electric circuit (not shown) of the recorder 18 to drive the motor 42 of the recorder. The operative connection between the colorimeter and the recorder motor is indicated by the broken lines 44 and the motor drives a rotary threaded shaft 46 for operating the stylus 48 of the recorder. The stylus is secured to a nut 50 which is prevented from rotation so that rotation of the shaft 46 causes longitudinal movement of the nut 50 along the length of the shaft to provide transverse movement of the stylus 48 relative to the chart paper of the recorder which is moving in the direction indicated by the arrow 52. Since the recorder is of the multi-point type, the stylus does not print on the recorder chart paper as it moves transversely to its printing position but at said printing position the stylus is actuated by a suitable mechanism and prints on the chart paper. In this manner a plurality of curves representing different characteristics of the liquid are simultaneously recorded on the chart paper. Pursuant to the invention, the shaft 46 is operatively connected by the spur gears 54 and bevel gears 56 to a rotary cam 58 which is movable in response to the movement of the stylus 48 of the recorder for controlling the operation of control circuit 20 so that interruption of the examination of the eluate for standardization operation is prevented if the examination of the eluate has begun and has not ended, as will be more fully understood hereinafter.

Referring now to FIG. 2, the control circuit 20 of the apparatus is shown in its normal eluate examining condition wherein valves 28 and 32 are open and valve 38 is closed so that eluate is flowing from the outlet 26 of the column through the apparatus and the flow of standard liquid is interrupted. Control circuit 20 comprises a timer 60 for controlling the eluate examining period of operation of the apparatus and a timer 62 for controlling the period of standardization operation of the apparatus. Any suitable timers may be used. As here shown, timer 60 is preferably a Model HP–5 timer manufactured by the Eagle Signal Company of Moline, Illinois and timer 62 is preferably a RC Series timer of the single cycle multi-cam type manufactured by the Industrial Timer Corporation of Newark, N.J. and only certain parts of each of the timers are illustrated herein, since the omitted parts are not necessary for the description of the invention. Timers 60 and 62 are effective to provide spaced periods of eluate examining operation of the apparatus during spaced intervals of time and spaced periods of standardization operation between said spaced time intervals. The circuit 20 also includes a timer control circuit 64 which includes a relay 66 that operates a control switch 68 for timer 60. Switch 68 is normally closed during timing operation of timer 60 and when it opens the timer is automatically moved into its reset condition wherein movable contact g closes contact h and movable contact i closes contact j which are the same positions of said contacts during timing operation of the timer. In the timed-out condition of timer 60, movable contact g closes contact k and opens contact h and movable contact i closes contact l and opens contact j. Closing switch 68, after it has been opened to reset the timer, initiates timing operation of the timer.

The power lines for the control circuit 20 are indicated at L1 and L2, and it will be observed that opening of switch 68 results in the loss of power to the clutch coil 70 of timer 60 to reset said timer and it is to be understood that loss of power to the clutch coil is always operative to reset the timer. Loss of power to the clutch coil can also be caused by the operation of timer 62 since said timer includes a movable contact m of a microswitch 72 which is included in the circuit that includes switch 68, said circuit comprising line L1, lead 74, lead 76, switch 72, lead 78, lead 80, switch 68, lead 82, lead 84, clutch coil 70, leads 86 and 88, and line L2.

The operation of control circuit 20 and the other components thereof will now be explained in further detail. As indicated previously, the circuit is shown in eluate examination condition wherein solenoids 30 and 34 are energized to open valves 28 and 32 to permit the flow of eluent and eluate, respectively, and solenoid 40 is de-energized so that valve 38 is closed to prevent the flow of standard liquid. The circuits for controlling these solenoids can be traced as follows: Line L1, lead 74, lead 76, switch 72 of timer 62, lead 78, lead 89, lead 90, lead 91 and line L2. Solenoids 30 and 34 are connected across leads 89 and 90 so that said solenoids are energized and valves 28 and 32 are open when contacts m and n of switch 72 are closed, as shown, for eluate examining operation of the apparatus. Solenoid 40 is de-energized because one side of the solenoid is connected to open contact o of switch 72, via lead 92, and the other side of the solenoid is connected to lead 90, as shown. Pump 22 is energized when solenoids 30 and 34 are energized since the solenoids and the pump are connected in parallel. The operation of the pump is effective to pump the eluent, as previously indicated.

The position of movable contact m of switch 72 controls the energization of the solenoids and the operation of said movable contact is controlled by the cam 94 of timer 62. In the position shown, the contact part 95 of actuating arm 96 of the switch engages the peripheral edge of the cam and when said part falls into the cutout 98 of the cam, contact m is moved and engages contact o to complete an energization circuit to solenoid 40 for standardization operation of the apparatus and simultaneously opens the circuit to the other solenoids causing their respective valves to close. Cam 94 is connected to the shaft of the timing motor 100 of timer 62 and during the eluate examining operation of the apparatus, said motor is de-energized since its operation is controlled by the microswitch 102 of timer 62. In the de-energized condition of timer 62, movable contact p of switch 102 closes contact q and opens contact r of the switch whereby the energizing circuit for the motor through line L2, lead 91, lead 104, motor 100, lead 106, switch 102, lead 74, and line L1 is open.

In the position shown, motor 108 of timer 60 is energized and is operating the timer through an energization circuit comprising line L2, lead 88, lead 110, motor 108, lead 112, closed contacts i and j, lead 82, closed switch 68, leads 80 and 78, closed contacts m and n of switch 72, leads 76 and 74, and line L1. It is to be noted that if switch 68 opens or if contacts m and n of switch 72 of timer 62 open, the energization circuit to timer motor 108 opens to stop the timing operation of timer 60 and the timer is automatically moved into reset condition.

Relay 116 of timer 62, which controls the operation of actuating arm 118 of switch 102, is de-energized during timing operation of timer 60 so that contacts p and q of switch 102 are closed because the energization circuit for relay 116 is open at contacts g and k of timer 60, said energization circuit comprising line L1, contacts g and k of timer 60, lead 120, relay 116, lead 122, lead 104, lead 91 and line L2. Energization of relay 116 starts the operation of timer 62 because upon energization, the relay actuates arm 118 causing the closing of contacts p and r of switch 102 which completes an energization circuit to the timer motor 100, in the manner previously indicated. Subsequent loss of power to relay 116 after energization of motor 100 doesn't result in the de-energization of said motor because of the disc cam 124 which is connected to the shaft of the motor. Cam 124 includes a cutout portion 126 which is engaged by contact part 128 of arm 118 when the relay 116 is de-energized and the cam is in the position shown. Upon energization of the relay, part 128 is caused to move out of said cutout and rotation of cam 124 due to the operation of motor 100 moves the cutout away from the position of part 128 so that upon de-energization of relay 116 said part engages the peripheral edge of the cam which prevents the opening of contact r of switch 102 until cam 124 makes a complete revolution to return cutout 126 to the position shown. In said position, part 128 moves into cutout 126 and opens contact r and simultaneously closes contact q to end the operating period of timer 62. The length of the timing period of timer 62 must always be less than the length of the timing period of timer 60 so that timer 62 is always in condition to start the timing of the standardization operating period of the apparatus at the conclusion of the eluate examining period which is controlled by timer 60.

The energization of relay 66 which controls the position of switch 68 is controlled by the cam 58 that is operatively connected to the stylus 48 of the recorder by the gears 54 and 56 and is movable in response to the movement of said stylus. The cam controls the operation of a microswitch 130 and has a cutout portion 132 in which extends the cam engaging part 134 of the actuating arm 136 of the switch when the position of the stylus 48 of the recorder is close to the base line of the recorder, which represents the 100% light transmittance value, or the position of the stylus is at a light transmittance value which is above a predetermined value, for example 85% or higher, or in a range from 85% to 100%. This range of light transmittance values coresponds to the values which occur near the beginning and end of an examination of the eluate from a zone of the chromatogram. In other words, portion 132 of the cam corresponds to the positions of the stylus which are about between 85% to 100% light transmittance values, as indicated on the recorder chart paper. In these positions of the stylus, movable contact s of switch 130 is in the position shown and stationary contact t of the switch is open so that relay 66 is de-energized and switch 68 closed because the energization circuit for relay 66 is open. Said circuit can be traced as follows: Line L1, lead 138, switch 130, lead 140, rectifier 142, resistance 144, lead 146, relay 66, leads 148 and 91, and line L2.

With the stylus of the recorder between 85% to 100% light transmittance values so that relay 66 is de-energized, the circuit is in condition to begin standardization operation of the apparatus as soon as timer 60, which controls the eluate examining period, moves into its timed-out condition. Standardization operation cannot occur at the end of an eluate examining period if the position of the stylus is below the 85% light transmittance value which indicates that eluate is being examined. This prevents interruption of the examination of the eluate from a zone of the chromatogram when its examination has begun and has not been completed. Since it is difficult to know in advance the periods during which the eluates from the various zones of the chromatogram pass through the colorimeter, the control circuit 20 prevents the start of a period of standardizing operation of the apparatus when the eluate from a zone is passing through the colorimeter. In this way, there is no interruption of the examination of the eluates from the chromatography column for standardization and the standard curves resulting from standardization are positioned on the recorder chart paper, as shown, so that they do not interfere with the curves resulting from the examination of the eluates. Therefore, the relationship of the eluate examining periods to the standardization periods is non-linear; i.e., non-cyclic, due to the fact that the standardization period cannot be initiated until the light transmittance value at the stylus 48 is in excess of a predetermined value, here indicated at 85% light transmittance.

At the conclusion of the eluate examining period as set by the timer 60, the timer is in its timed-out condition and contacts i and j are open. Opening of contacts i and j opens the energization circuit to timer motor 108 and stops the timing operation of the motor. Closing of contacts g and k completes the energization circuit through relay 116 which causes the closing of contacts p and r of switch 102 of timer 62. This energizes timer motor 100 of timer 62 and starts the operation of the timer for timing the standardization operation of the apparatus. Rotation of motor 100 moves the cutout portion 98 of cam 94 into position to receive the cam engaging part 95 of arm 96 of switch 72 causing the closing of contacts m and o and the opening of contacts m and n of said switch which results in the energization of solenoid 40 and simultaneously results in the de-energization of solenoids 30 and 34 and pump 22 to stop the flow of eluate to the colorimeter and start the flow of the standard liquid to the colorimeter for standardization operation. As soon as cutout portion 98 of cam 94 moves away from the position of the cam engaging part 95, contacts m and o open and contacts m and n close to stop the flow of standard liquid to the colorimeter and simultaneously commence the flow of eluate in lieu of said standard liquid. However, motor 100 of timer 62 continues to rotate since once energized it does not stop rotating until it completes one revolution because of cam 124. Different cams 94 may be provided to provide different lengths of periods of standardization operation since it is to be understood that the length of the period of standardization is controlled by the cutout portion 98 of cam 94.

As indicated previously, opening of contacts m and n of switch 72 results in the de-energization of clutch solenoid 70 of timer 60 and simultaneously with the closing of contacts m and o to commence the flow of standard liquid to the apparatus, timer 60 is reset. In the reset condition of the timer, contacts g and h are closed and contacts i and j are also closed so that relay 116 is de-energized because of the opening of contacts g and k. However, by this time cutout portion 126 of cam 124 has moved from the position shown and part 128 of arm 118 of switch 102 engages the edge of the cam and the opening of contacts p and r is prevented even though relay 116 is de-energized. Timer motor 108 of timer 60 is not energized because its energization circuit is open because of open contacts m and n of timer 62. When these contacts are again closed by the action of cam 94, timer 60 commences its timing cycle for the eluate examining period of operation of the apparatus.

In the event that at the end of a period of eluate examining operation of the apparatus, when timer 60 is in its de-energized condition, and the position of the stylus 48 is at a light transmittance value which is less than 85%, then switch 68 is open because of the energization of relay 66 caused by the position of cam 58. The open switch 68 resets the timer so that contacts g and k are open in this de-energized condition of the timer since this is also the reset position of said contacts and, as previously explained because of the loss of power to the clutch solenoid 70 of the timer due to the opening of switch 68 causes timer 60 to automatically move into its reset condition. Therefore, relay 116 of timer 62 is not energized, the standardization period of operation does not begin, and the solenoids 30 and 34 as well as pump 22 remain energized and the examination of the eluate continues without interruption. When the stylus of the recorder moves to the 85% light transmittance value, switch 68 closes and another eluate examining period begins. It is to be observed that if switch 68 is open at the end of an eluate examining period, timer 62 is not actuated to commence the standardization period of operation and another timed eluate examining period starts upon closing of switch 68 due to de-energization of relay 66.

When the eluate examining period begins, the stylus of the recorder is at the base line which is at the 100% light transmittance value and as eluate continues to pass through the colorimeter the stylus moves to lower light transmittance values to form the ascending portions of the light transmittance curves. When the stylus of the recorder passes the 85% light transmittance value, switch 68 of timer 60 opens to stop the timing operation of the timer and the timer moves into its reset position. Eluate continues to flow through the colorimeter and the stylus of the recorder will continue to ascend to a peak value and then descend to form the descending portions of the curves and when the stylus moves past the 85% light transmittance value, switch 68 is closed to begin the operation of timer 60. It is to be noted that the major portions of the curves which indicate light transmittance values of 85% and less are formed during inoperation of timer 60. Since timer 60 is not timing during the major part of the eluate examining period, this lessens the necessity of precise determinations for the setting of said timer and this is especially noteworthy since the exact time required for eluting a zone of the chromatogram is not generally known ahead of time.

Timer 60 continues to operate and complete its timing cycle and during this timing cycle the remaining portions of eluate pass through the colorimeter so that the stylus of the recorder returns to the 100% light transmittance value position or the base line of the recorder. At this time the eluate examining period has ended and the standard liquid is introduced into the apparatus while the stylus is at the base line or close to it. This avoids any possible interference of the standard curves with the curves resulting from the examination of the eluate and there is no overlapping of the standard curves with said eluate curves.

It will be recalled that recorder 18 is of the multipoint type wherein stylus 48 moves back and forth transversely of the recorder chart paper so that near the 85% light transmittance value the stylus will move above and below said value for a short interval as it prints the various portions of the different curves. In order to avoid chattering of switch 68 due to the alternate energization and de-energization of relay 66, a time-delay circuit 150 is provided in the circuit of the relay 66. The components of the time-delay circuit are such as to prevent energization or de-energization of the relay for a predetermined time interval even though the circuit to the relay is closed due to the back and forth movement of the stylus in the vicinity of the 85% light transmittance value.

If it is desired or necessary to interrupt eluate examining operation and begin standardization operation, switch 147 may be momentarily closed to complete an energization circuit to relay 116 via leads 149 and 151.

Referring now to FIG. 3, there is shown a modification on the invention wherein during standardization operation the eluent and resulting eluate are not prevented from flowing but are bypassed and standard liquid only is delivered to the apparatus. This is accomplished by providing a chromatography column 12′ with an outlet 26′ that includes an eluate discharge opening 152. Valve 28 for the eluent has been eliminated and the flow of eluate and the standard liquid to the apparatus is controlled by valves 32 and 38 only. The inlet opening 24 to the chromatography column 12′ is connected by suitable tubing 154 to a pump tube (not shown) of proportioning pump 14 and pump 22 has been eliminated. The solenoids 34 and 40 for valves 32 and 38, respectively, are connected in the control circuit 20 in the same manner as previously described and the control circuit is the same except that solenoid 30, valve 28 and pump 22 have been eliminated.

During eluate examining operation of the apparatus, valve 38 is closed to prevent the flow of standard liquid to the apparatus and valve 32 is open to permit the flow of eluate to the apparatus. A major portion of the eluate from outlet 26′ of the column flows through the open valve 32 and a minor portion of the eluate is discharged through outlet 152 and this is accomplished due to the aspiration of eluate through valve 32 because of the action of pump 14. During standardizing operation of the apparatus, valve 32 is closed and valve 38 is open to permit the flow of standard liquid to the apparatus. Since valve 32 is closed, all of the eluate from the column is discharged through outlet 152 to waste or to a suitable receptacle. In this manner the transmission of eluent to the column and eluate from the column is not interrupted even though standardizing operation of the apparatus is occurring between periods of eluate examining operation.

In lieu of the valve arrangement shown in FIG. 1, there may be provided a rotary solenoid operated valve for controlling the flow of eluent to the column and a rotary solenoid operated valve for controlling the flow of eluate from the column and for controlling the flow of the standard liquid. Such an arrangement is shown and described in the copending application of Hewitt M. Barnum, Serial No. 123,872, filed July 13, 1961 concurrently herewith, and assigned to the assignee of the present application.

The present invention is not specifically concerned with any particular analysis in respect to the chemistry thereof but, on the contrary, relates broadly to continuous chromatographic analysis of various eluates from a chromatography column. While it will be apparent to those skilled in the art that the apparatus is well adapted for chromatgraphic analysis of many substances, the apparatus is especially well adapted for analysis of amino acids. In the operation of the apparatus for amino acids analysis, after the chromatography column 12 has been prepared in accordance with well known practice, the apparatus is operated for stripping the column. For this purpose the pump 22 is operated to supply the eluent to the inlet 24 of the column and in the case of amino acids the eluent is a well known buffer of suitable pH. The eluate flows from the column through its outlet 26 and is pumped by the action of proportioning pump 14 through conduit 156 and pump tube 158 to a fitting 160 where the eluate stream mixes with air or other inert gas, supplied through pump tube 162, and a suitable diluent liquid supplied through pump tube 164 to form a segmented stream consisting of a series of liquid segments containing diluted eluate separated from each other by a series of intervening segments of air. A suitable diluent liquid, in the case of amino acid analysis, is methyl cellosolve. The air segments serve to cleanse the various tubular passages of the apparatus. From fitting 160 the segmented eluate stream passes through a horizontal helical mixing coil 166 wherein the constituents of each liquid segment are mixed together. Concurrently with the transmission of the eluate through pump tube 158, suitable color producing reagents for treating the eluate for colorimetric examination are transmitted through pump tubes 168 and 170, respectively. In the case of amino acid analysis, the color reagent is ninhydrin which is supplied through pump tube 168 and hydrindantin which is a reducing agent and is supplied through pump tube 170. The ninhydrin and hydrindantin join each other in fitting 172 and are mixed together in helical mixing coil 174 and from said mixing coil the color reagent stream joins the segmented eluate stream and the color reagent liquid is mixed with the diluted eluate segments of the stream in horizontal helical mixing coil 176. From mixing coil 176 the stream is passed through the coil 178 which is immersed in the liquid of a heating bath 180 for developing the color and it will be understood that the intensity of the color is a measurement of the quantity of the constituent present in the eluate. The stream is then cooled in the air cooled coil 182 and is transmitted to the flow cuvette of the colorimeter 16 for colorimetric analysis. The examined liquid is discharged from the colorimeter through outlet 184. The results of the colorimetric examination are recorded on the chart paper of the record 18.

The proportioning pump 14 may be of any suitable type although it is preferably of the type described in U.S. Patent No. 2,935,028. Briefly described, the pump comprises the previously mentioned pump tubes which are resiliently flexible and are compressed progressively along their lengths for the pumping operation by the engagement therewith of a plurality of pressure rollers 186 against a platen 188. The pressure rollers are driven by the endless sprocket chains 190 and move longitudinally of the pump tubes to fully close said tubes progressively along their lengths in the direction indicated by arrow 192 and thus propel the liquids and other fluids for transmitting them from sources of supply to points of delivery. It will be apparent that the action of the pressure rollers with respect to pump tube 158 results in aspirating the eluate through outlet 26 of the column.

Since the colorimeter 16 is a well known type and does not, per se, form part of the invention, a further description of the colorimeter is unnecessary.

Continuous chromatography analysis apparatus of the type to which the present invention relates is shown in the U.S. application of Edwin C. Whitehead et al., Serial No. 548,037, filed November 21, 1955, now U.S. Patent 3,010,798, which shows a multi-point recorder, and in the U.S. application of Andres Ferrari, Serial No. 811,033, filed May 5, 1959, now U.S. Patent 3,074,784, both assigned to the assignee of my present application. It will be understood that in lieu of a colorimeter with a single flow cell as shown in said application, Serial No. 548,037, with provision for exposing the liquid under analysis successively to light of different wave lengths, as above stated, the apparatus may have a plurality of flow cells through which the liquid under analysis flows in series and in which the liquid is exposed seriatim to the light of different wave lengths, respectively, as disclosed in said application, Serial No. 811,033.

While I have shown and described the preferred embodiment of my invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. Chromatography analysis apparatus, comprising a chromatography column, analyzing means, means for controlling the flow of eluate from said column to said analyzing means for the eluate analyzing operation of said analyzing means, means for controlling the flow of a standard liquid having a known constituent of known concentration to said analyzing means in lieu of said eluate for standarization operation of said analyzing means, and means responsive to the operation of said analyzing means for controlling the operation of each of said controlling means to permit the flow of said standard liquid to said analyzing means in lieu of said eluate for standardization operation of said analyzing means.

2. Chromatography analysis apparatus, comprising a chromatography column having an inlet for the eluent and an outlet for the eluate from the column, analyzing means, means for pumping said eluent through said inlet and for concurrently pumping said eluate through said outlet to said analyzing means for eluate analyzing operation of said analyzing means, means operatively connected to said pumping means for transmitting a standard liquid having a known constituent of known concentrations to said analyzing means in lieu of said eluate for standardization operation of said analyzing means, valve means for controlling the flow of said eluate to said analyzing means and valve means for controlling the flow of said standard liquid to said analyzing means, said outlet of said chromatography column having a discharge opening for said eluate from said column, and means responsive to the operation of said analyzing means for closing said valve means for said eluate and for simultaneously opening said valve means for said standard liquid to permit the transmission of said standard liquid to said analyzing means by the operation of said pumping means for standardization operation of said analyzing means and the discharge of said eluate through said discharge opening concurrently with the transmission of said standard liquid.

3. Chromatography analysis apparatus, comprising a chromatography column, a colorimeter for examining the eluate from said column, a recorder operable under the control of said colorimeter for recording the results of the colorimetric examination, means for transmitting the eluate from said column to said colorimeter for eluate examining operation of said colorimeter and said recorder, means for transmitting a standard liquid having a known constituent of known concentration to said colorimeter in lieu of said eluate for standardization operation of said colorimeter and said recorder, valve means for controlling the flow of said eluate and standard liquid to said colorimeter, timing means operatively connected to said valve means for controlling the examining period of said eluate, other timing means operatively connected to said valve means for controlling the period of standardizing operation of said colorimeter and said recorder, and means responsive to the operation of said recorder during colorimetric examination of said eluate for preventing the operation of said timing means for the standardizing period and for causing the operation of said timing means for the eluate examining period in the event that the response of said recorder at the end of the eluate examining period is below a predetermined value.

4. Chromatography analysis apparatus, comprising a chromatography column, a colorimeter for examining the eluate from said column, a recorder operable under the control of said colorimeter for recording the results of the colorimetric examination, means for transmitting the eluate from said column to said colorimeter for eluate examining operation of said colorimeter and said recorder, means for transmitting a standard liquid having a known constituent of known concentration to said colorimeter in lieu of said eluate for standardization operation of said colorimeter and said recorder, valve means for controlling the flow of said eluate and standard liquid to said colorimeter, timing means operatively connected to said valve means to periodically interrupt the transmission of eluate to said colorimeter and to simultaneously cause the transmission of said standard liquid to said colorimeter for standardization operation of said colorimeter and said recorder, and means responsive to the operation of said recorder to prevent the operation of said timing means unless the response of said recorder at the end of an eluate examining period is above a predetermined value.

5. Chromatography analysis apparatus, comprising a chromatography column, a colorimeter for examining the eluate from said column, a recorder operable under the control of said colorimeter for recording the results of the colorimetric examination, means for transmitting the eluate from said column to said colorimeter for eluate examining operation of said colorimeter and said recorder, means for transmitting a standard liquid having a known constituent of known concentration to said colorimeter in lieu of said eluate for standardization operation of said colorimeter and said recorder, solenoid operated valve means for controlling the flow of said eluate and said standard liquid to said colorimeter, timing means operable to periodically actuate each of said valve means to interrupt the flow of eluate to said colorimeter and cause the flow of standard liquid to said colorimeter, and means responsive to the operation of said recorder for controlling the operation of said timing means to prevent the interruption of the flow of eluate to said colorimeter in the event that the response of the recorder at the end of an eluate examining period is below a predetermined value.

6. Chromatographic analysis apparatus, comprising a chromatography column, a colorimeter for examining the eluate from said column, a recorder operable under the control of said colorimeter and having a movable stylus for recording the results of said colorimetric analysis, solenoid operated valve means for controlling the flow of said eluate to said colorimeter for eluate examining operation of said colorimeter and said recorder and for controlling the flow of a standard liquid having a known constituent of known concentration to said colorimeter in lieu of said eluate for standardization operation of said colorimeter and said recorder, timing means operatively connected to said valve means for controlling the operation thereof to provide spaced periods of eluate examining operation during spaced intervals of time and spaced periods of standardization operation between said spaced intervals of time, said timing means including a first timer for controlling the time duration of the eluate examining period of operation and a second timer for controlling the time duration of the standardization period of operation, and movable means operatively connected to said first and second timers and to said stylus of said recorder and movable in response to the movement of said stylus for controlling the operation of said timers to prevent the start of a standardization period unless the position of said stylus at the end of an eluate examining period is above a predetermined value.

7. Chromatographic analysis apparatus, comprising a chromatography column, a colorimeter for examining the eluate from said column, a recorder operable under the control of said colorimeter and having a movable stylus for recording the results of said colorimetric analysis, a plurality of solenoid operated valve means for controlling the flow of said eluate to said colorimeter for eluate examining operation of said colorimeter and said recorder and another solenoid operated valve means for controlling the flow of a standard liquid having a known constituent of known concentration to said colorimeter in lieu of said eluate for standardization operation of said colorimeter and said recorder, timing means operatively connected to said valve means for controlling the operation thereof to provide spaced periods of eluate examining operation during spaced intervals of time and spaced periods of standardization operation between said spaced intervals of time, and movable means operatively connected to said timing means and to said stylus of said recorder and movable in response to the movement of said stylus for controlling the operation of said timing means to prevent the start of a standardization period unless the position of said stylus at the end of an eluate examining period is above a predetermined value.

References Cited in the file of this patent
UNITED STATES PATENTS

| | | |
|---|---|---|
| 2,797,149 | Skeggs | June 25, 1959 |
| 2,890,617 | Lupfer et al. | June 16, 1959 |